May 10, 1955

J. E. MASCIANA 2,707,932

MEMORANDUM INDICATOR

Filed Aug. 23, 1954

INVENTOR.
Joyce Elaine Masciana

BY

Fish and Huff

United States Patent Office 2,707,932

Patented May 10, 1955

2,707,932

MEMORANDUM INDICATOR

Joyce Elaine Masciana, Greenville, S. C.

Application August 23, 1954, Serial No. 451,564

6 Claims. (Cl. 116—135)

This invention is a memorandum indicator disc.

One object of the invention is to provide a memorandum indicator disc having a list of the leading articles required in a given place, arranged in easily located groups and individual markers shiftable into and out of indicating position.

Another object of the invention lies in the provision of a memorandum indicator having means for retaining the markers in a given position without danger of accidental movement during operation of the other markers.

Other objects of the invention lie in the provision of a memorandum indicator which is comparatively simple in construction, strong, durable, highly efficient and reliable in use, compact and which may be manufactured at low cost.

All of the foregoing and other objects of the invention will become apparent from a study of the following specification taken in connection with the accompanying drawings wherein like characters of reference designate corresponding parts throughout the several views and wherein a preferred form of the invention is shown. It should be understood however that the drawings and description are illustrative only and are not intended to limit the invention except insofar as it is limited by the prior art and the appended claims.

Figure 1:
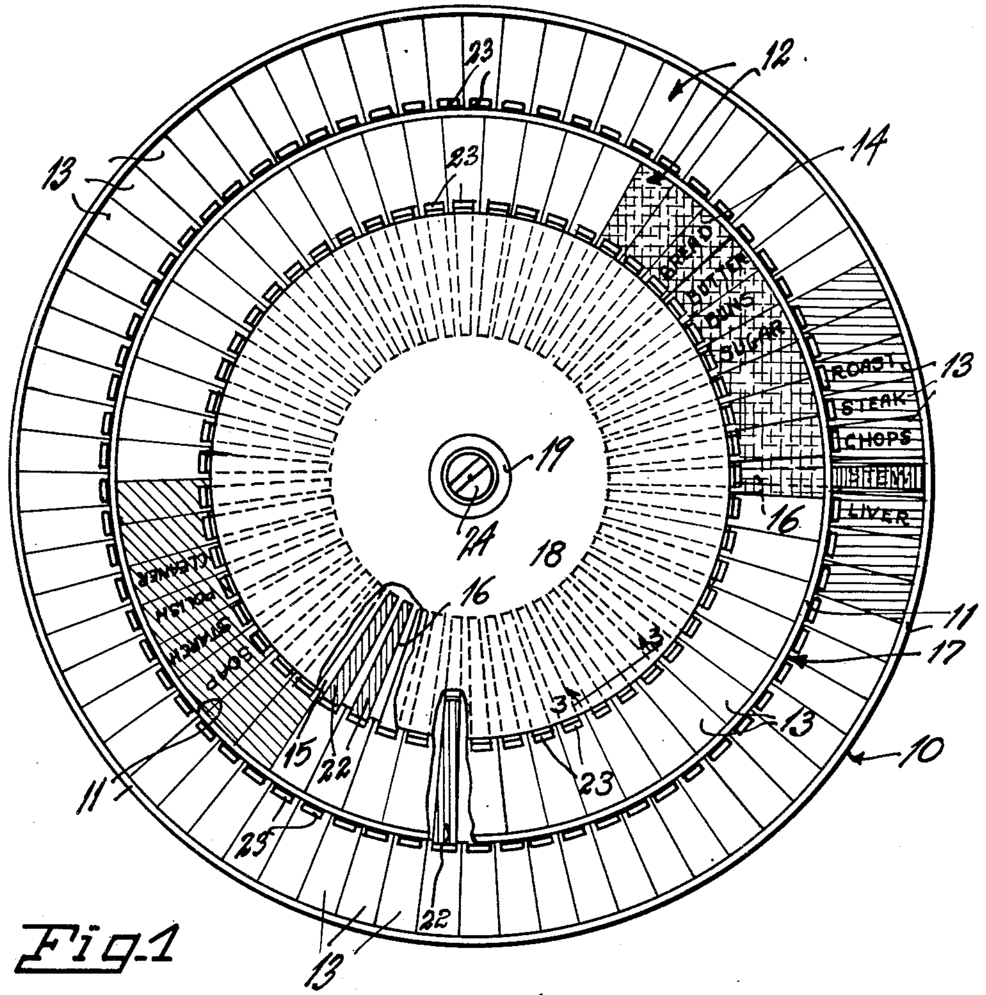
Figure 1 is a plan view of a memorandum indicator embodying my invention and having parts broken away for convenience of illustration.

Referring now more particularly to the drawing, I have provided my memorandum indicator with a main disc 10 which has an annular upstanding rib 11 on its marginal upper face which also is provided with an annular series 12 of inwardly tapered radially disposed name bearing divisions 13 further classified in significant groups 14 identified by various colors. At its center the disc 10 is provided with an annular concentric thickened portion 15 in which is formed a plurality of radially disposed inwardly tapered guide ways 16.

A second disc 17 is concentrically arranged and superimposed upon the main disc 10 and is of a circumference equal to the circumference of the center portion 15 of the main disc. The second disc 17 is also provided with the marginal flange 11, annular series 12 of inwardly tapered radially disposed name bearing divisions 13 further defined in significant categories by colors 14 and having the thickened center portion 15 in which a plurality of radially disposed inwardly tapered guide ways 16 are formed. It is thus seen that the second disc 17 is like the first disc 10 except the circumference of the second disc is somewhat less than the circumference of the main disc.

A top disc 18 is concentrically arranged and superimposed upon the second disc and is of a circumference equal to the annular thickened center portion of the second disc and is provided with a concentric upstanding hollow thumb knob 19. Within the thumb knob 19 at the axes of the superimposed discs the discs are each apertured to form aligned axial bores 20. A hollow rivet 21 extends through the bores 20 and is riveted to secure the discs in concentric superimposed relation and the rivet is sufficiently loose to permit manual rotation of one disc upon the others.

Marking or indicator bars 22 are provided one for each guide way and are tapered to fit the guide ways when in the retracted position and are manually movable into and out of covering relation to said name bearing divisions and have means 23 consisting of upwardly disposed right angle lips on the outer ends thereof for manually shifting the bars. Each bar is somewhat thicker than the depth of its cooperating way so that the superimposed discs bear upon the bars and frictionally yieldably retain the bars as well as the discs for manual movement relative to each other.

Figure 2:
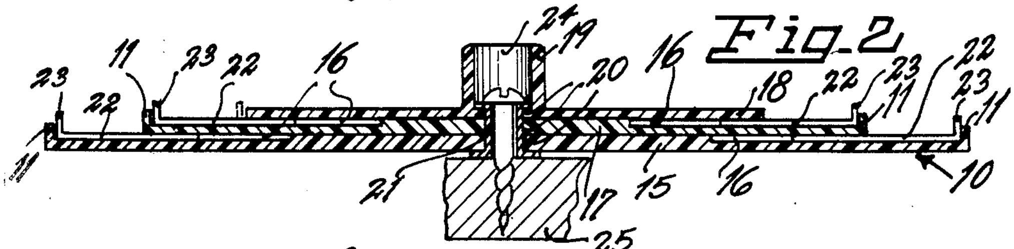
Figure 2 is a vertical cross section taken on the diameter of the indicator disclosed in Figure 1; and, Figure 3 is an enlarged vertical fragmentary cross section as at line 3—3 of Figure 1.
Figure 3:
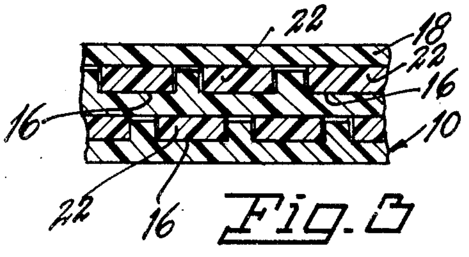

As disclosed in Figure 2 if it is desired to mount the memorandum indicator on a wall or table a headed screw or bolt 24 may be passed through the hollow rivet 21 and anchored in a supporting member 25.

For a more further detailed understanding of the invention I will set forth a hypothetical circumstance of use thereof. During the week as the housewife discovers a need for certain articles, selected ones of the marking or indicator bars 22 are manually shifted outwardly to cover the word or words representing the article or articles needed. As shown in Figure 1, the indicator bar 22 is in covering relation to the word stew which indicates that stew meat is required upon the next shopping trip. The meats are preferably listed in a significant group and may be collectively provided with a blue coloration so that when the indicator bar 22 is shifted in covering relation thereto its red color will contrast in such a way as to make the selection more than just apparent. The articles which will be purchased in the grocery store will be preferably listed in a separate group which may be colored yellow as indicated, and still further articles to be purchased at a hardware or other store may be listed in still another group with another distinguishing color.

All of the indicator bars will be one color, preferably red, so that they may be easily distinguished. When a shopping trip is anticipated, each of the extended indicator bars will be manually shifted out of the indicating position and the item marked thereunder written upon a shopping list. When all of the indicator bars are returned to their normal storing position, each item will have been written on the shopping list and nothing will be forgotten.

The various discs rotate with respect to each other so that it will not be necessary to read the indicia in an inverted position, but it may be shifted around to a position where it may be easily read on the right hand side of the memorandum indicator.

Obviously, the essence of the invention may be incorporated in a single main disc and a top disc or a larger number of discs than three may be employed if found necessary and desirable.

Having thus described my invention, I claim:

1. A memorandum indicator comprising a main disc having an annular upstanding rib on its marginal side face, and provided with an annular series of inwardly tapered radially disposed name bearing divisions grouped in significant classifications by color, and an annular concentric thickened center portion having a plurality of radially disposed inwardly tapered guide ways; a second disc like said main disc and having a circumference equal to the circumference of the center portion of said main disc and disposed upon the face thereof; a top disc having a circumference equal to the circumference of the center portion of said second disc and disposed upon the face thereof, and having a concentric upstanding hollow thumb knob; said discs having aligned axial bores; a hollow rivet pivotally uniting said discs; bars of a color different from said classification colors slidable in said guide ways into and out of covering relation to said name bearing divisions; said bars being thicker than the depth of said ways, whereby the disc next above bears upon said bars and frictionally precludes accidental radial movement thereof; and lips on the outer ends of said bars for manually shifting selected ones into and out of covering relation to said name bearing divisions.

2. A memorandum indicator comprising a main disc having an annular upstanding rib on its marginal side face, and provided with an annular series of inwardly tapered radially disposed name bearing divisions and an annular concentric thickened center portion having a plurality of radially disposed inwardly tapered guide ways; a second disc like said main disc and having a circumference equal to the circumference of the center portion of said main disc and disposed upon the face thereof; a top disc having a circumference equal to the circumference of the center portion of said second disc and disposed upon the face thereof, and having a concentric upstanding hollow thumb knob; said discs having aligned axial bores; a hollow rivet in said bores pivotally uniting said discs; bars slidable in said guide ways into and out of covering relation to said name bearing divisions; said bars being thicker than the depth of said ways, whereby the disc next above bears upon said bars and frictionally precludes accidental radial movement thereof; and lips on the outer ends of said bars for manually shifting selected ones into and out of covering relation to said name bearing divisions.

3. A memorandum indicator comprising a number of discs each having an annular upstanding rib on its marginal side face, and provided with an annular series of inwardly tapered radially disposed name bearing divisions, and an annular concentric thickened center portion having a plurality of radially disposed inwardly tapered guide ways; said discs being superimposed one upon another and each having a circumference equal to the circumference of the center portion of the next lower disc; a top disc having a circumference of the center portion of the upper one of said first named discs and disposed upon the face thereof, and having a concentric upstanding hollow thumb knob; said discs having aligned axial bores; a hollow rivet in said bores pivotally uniting said discs; bars slidable in said guide ways into and out of covering relation to said name bearing divisions; said bars being thicker than the depth of said ways, whereby the disc next above bears upon said bars and frictionally precludes accidental radial movement thereof; and lips on the outer ends of said bars for manually shifting selected ones into and out of covering relation to said name bearing divisions.

4. A memorandum indicator comprising a main disc having an annular upstanding rib on its marginal side face, and provided with an annular series of inwardly tapered radially disposed name bearing divisions, and an annular concentric thickened center portion having a plurality of radially disposed inwardly tapered guide ways; a top disc having a circumference equal to the circumference of the center portion of said main disc and disposed upon the face thereof, and having a concentric upstanding hollow thumb knob; said discs having aligned axial bores; a hollow rivet in said bores pivotally uniting said discs; bars slidable in said guide ways into and out of covering relation to said name bearing divisions; said bars being thicker than the depth of said ways, whereby the top disc bears upon said bars and frictionally precludes accidental radial movement thereof; and lips on the outer ends of said bars for manually shifting selected ones into and out of covering relation to said name bearing divisions.

5. A memorandum indicator comprising a main disc having an annular upstanding rib on its marginal side face, and provided with an annular series of inwardly tapered radially disposed name bearing divisions, and an annular concentric thickened center portion having a plurality of radially disposed inwardly tapered guide ways; a top disc having a circumference equal to the circumference of the center portion of said main disc and disposed upon the face thereof, said discs having aligned axial bores; means pivotally uniting said discs at their axes; bars slidable in said guide ways into and out of covering relation to said name bearing divisions; said bars being thicker than the depth of said ways, whereby the top disc bears upon said bars and frictionally precludes accidental radial movement thereof; and lips on the outer ends of said bars for manually shifting selected ones into and out of covering relation to said name bearing divisions.

6. A memorandum indicator comprising a main disc having an annular upstanding rib on its marginal side face, and provided with an annular series of inwardly tapered radially disposed name bearing divisions, and an annular concentric thickened center portion having a plurality of radially disposed inwardly tapered guide ways; a top disc having a circumference equal to the circumference of the center portion of said main disc and disposed upon the face thereof, said discs having aligned axial bores; means pivotally uniting said discs at their axes; bars slidable in said guide ways into and out of covering relation to said name bearing divisions; said bars being thicker than the depth of said ways, whereby the top disc bears upon said bars and frictionally precludes accidental radial movement thereof; and means for manually shifting selected ones of said bars into and out of covering relation to said name bearing divisions.

References Cited in the file of this patent

UNITED STATES PATENTS

| | | |
|---|---|---|
| 1,717,048 | Livingston | June 11, 1929 |
| 1,837,707 | Fellows | Dec. 22, 1931 |